(12) United States Patent  
Hedman

(10) Patent No.: US 7,220,208 B2
(45) Date of Patent: May 22, 2007

(54) DEVICE FOR LUBRICATION OF A GEAR

(75) Inventor: Anders Hedman, Marstrand (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/164,528

(22) Filed: Nov. 28, 2005

(65) Prior Publication Data

US 2006/0207370 A1 Sep. 21, 2006

Related U.S. Application Data

(63) Continuation of application No. PCT/SE04/00626, filed on Apr. 23, 2004, now abandoned.

(30) Foreign Application Priority Data

May 28, 2003 (SE) .................................... 0301565

(51) Int. Cl.
F16H 57/04 (2006.01)
(52) U.S. Cl. ..................................................... 475/159
(58) Field of Classification Search ................. 475/159, 475/160
See application file for complete search history.

(56) References Cited

U.S. PATENT DOCUMENTS 6,817,962 B2 * 11/2004 Tanikawa .................... 475/159
6,855,083 B1 * 2/2005 Wagle et al. ................ 475/160

FOREIGN PATENT DOCUMENTS

JP 63-158344 * 7/1988 .................. 475/159
JP 6-207650 * 7/1994 .................. 475/159

* cited by examiner

Primary Examiner—Ha Ho
(74) Attorney, Agent, or Firm—Novak Druce & Quigg, LLP

(57) ABSTRACT

An arrangement for lubrication of a gear including a first gearwheel (402, 602, 702) in engagement with a second gearwheel (404), the teeth of the first gearwheel having an axial extent longer than the entire axial extent of the teeth of the second gearwheel. A first tooth surface of the first gearwheel is in engagement with the teeth of the second gearwheel. A second tooth surface of the first gearwheel (402, 602, 702) constitutes a part in a spline joint together with corresponding internal teeth of a gear element (423, 623, 723, 823). A lubricant duct (429, 629, 729, 829) is arranged so as to conduct lubricant to the first tooth surface. The lubricant duct (429, 629, 729, 829) consists of a space between a tooth tip and a corresponding tooth root in the spline joint. The gear element (423, 623, 723, 823) consists of a coupling ring. The first gearwheel (402, 602, 702) consists of a sun wheel. Both the coupling ring and the sun wheel form part of a range gearbox with planetary gear stages.

7 Claims, 5 Drawing Sheets (state of the art)

DEVICE FOR LUBRICATION OF A GEAR

CROSS-REFERENCE TO RELATED APPLICATIONS

The present application is a continuation patent application of International Application No. PCT/SE2004/000626 filed 23 Apr. 2004 now abandoned which was published in English pursuant to Article 21(2) of the Patent Cooperation Treaty, and which claims priority to Swedish Application No. 0301565-8 filed 28 May 2003. Said applications are expressly incorporated herein by reference in their entireties.

FIELD OF THE INVENTION

The present invention relates to a device for lubrication of a gear, typically included in a gearbox of a vehicle.

BACKGROUND OF THE INVENTION

From SE 464830, it is previously known, in a heavily loaded gear, such as a planetary gear in a vehicle gearbox, to distribute and guide lubricant by means of a specially designed ring in such a way that all the teeth on a gearwheel in the gear are lubricated at the same time. This is brought about by means of a circular-arc-shaped groove in the ring which bears against the end surface of the gearwheel, the groove being open toward the gearwheel. The groove extends around the entire periphery of the ring. Lubricant is fed to the groove from a pressurized duct. The groove is made concentrically with the gearwheel and has an outer delimiting surface which lies radially slightly outside the bottom surface in the tooth gaps between the teeth on the gearwheel. In this way, narrow apertures are formed in the tooth gaps between the teeth, where the groove is open toward the tooth gaps (see in particular FIG. 2 in SE 464830). Accordingly, the gearwheel is mounted on its shaft by a spline joint.

SE 514231 discloses a range gearbox of planetary gear type in which a spline joint is located directly adjacent to the teeth of the sun wheel. Here, the teeth on the sun wheel are extended at one end. A coupling ring has internal teeth which fit in the gaps between the extended teeth on the sun wheel. In the assembled state, a spline joint is then formed by these internal teeth and extended teeth. The spline joint means that the coupling ring is connected to the sun wheel in a rotationally fixed manner. The lubrication of the sun wheel cannot take place in the same way as in SE 464830, as the coupling ring is in the way. As indicated in the figures of SE 464830, lubricating oil is instead conducted from a central hole in the main shaft via a radially drilled hole to an annular groove on the inside of the sun wheel. From the groove, the lubricating oil is then distributed through small radial holes which are drilled in the bottom of each gap between the teeth on the sun wheel. This solution provides excellent lubrication, but the many small holes are disadvantageous as far as production is concerned and lead to inferior strength of the teeth in the sun wheel.

Against the background of the above, the object of the invention is therefore to make it possible to lubricate extended gearwheels, where the extended part of the gearwheel constitutes splines in a spline joint for securing, for example, a coupling ring, without weakening the teeth on the sun wheel, and also to facilitate the manufacture of the lubricating device.

SUMMARY OF THE INVENTION

In at least one exemplary embodiment, the invention takes the form of a device for lubrication of a gear. The invention comprises a first gearwheel in engagement with a second gearwheel, the teeth of the first gearwheel having an axial extent longer than the entire axial extent of the teeth of the second gearwheel. A first tooth surface of the first gearwheel is then formed, which surface is in engagement with the teeth of the second gearwheel, and a second tooth surface of the first gearwheel is formed, which surface constitutes a part in a spline joint together with corresponding internal teeth of a gear element. A lubricant duct is arranged so as to conduct lubricant to the first tooth surface. The invention is characterized in that the lubricant duct consists of a space between a tooth tip and a corresponding tooth root in said spline joint.

An advantage of the device according to the invention is that this solution is easier and thus less expensive to manufacture compared with that of SE 514231. By virtue of the fact that the lubricant duct consists of a space between tooth tip and tooth root, the number of manufacturing steps is greatly reduced. The lubricant duct is in principle manufactured most simply by machining one tooth tip or any number of tooth tips.

Another benefit of the device of the invention is that it provides excellent lubrication to the gear. The teeth of the first gearwheel do not have inferior strength as experienced in the arrangement of SE 514231.

According to an advantageous second embodiment of the device configured according to the invention, the inside diameter of the tooth tips of the gear element, at the lubricant duct mouth next to the second gearwheel, is smaller along a part of the axial extent of the tooth tips compared with the inside diameter of the remaining axial extent of the tooth tips.

The advantage of this is that the flow resistance is smaller in the part which has a larger inside diameter and also that where the inside diameter is smaller, the lubricant is concentrated so that small and more powerful lubricating jets are obtained at the mouth.

According to an advantageous third embodiment of the invention, an all-round groove on a third tooth surface between the first and second tooth surfaces is arranged so as to hold a ring in such a way that the ring, together with the tooth root of the first gearwheel, constitutes an extension of the lubricant duct and also that the ring to a certain extent obstructs the mouth of the lubricant duct for the purpose of obtaining a smaller mouth.

The advantage of this is also that the flow resistance is smaller in the part which has a larger inside diameter and also that where the inside diameter is smaller, the lubricant is concentrated so that small and more powerful lubricating jets are obtained at the mouth.

BRIEF DESCRIPTION OF THE DRAWINGS

The present invention will be described in greater detail below with reference to accompanying drawings which, for the purpose of exemplification, show the state of the art (FIG. 1) and also further preferred embodiments of the invention and in which.

DETAILED DESCRIPTION

Figure 1:
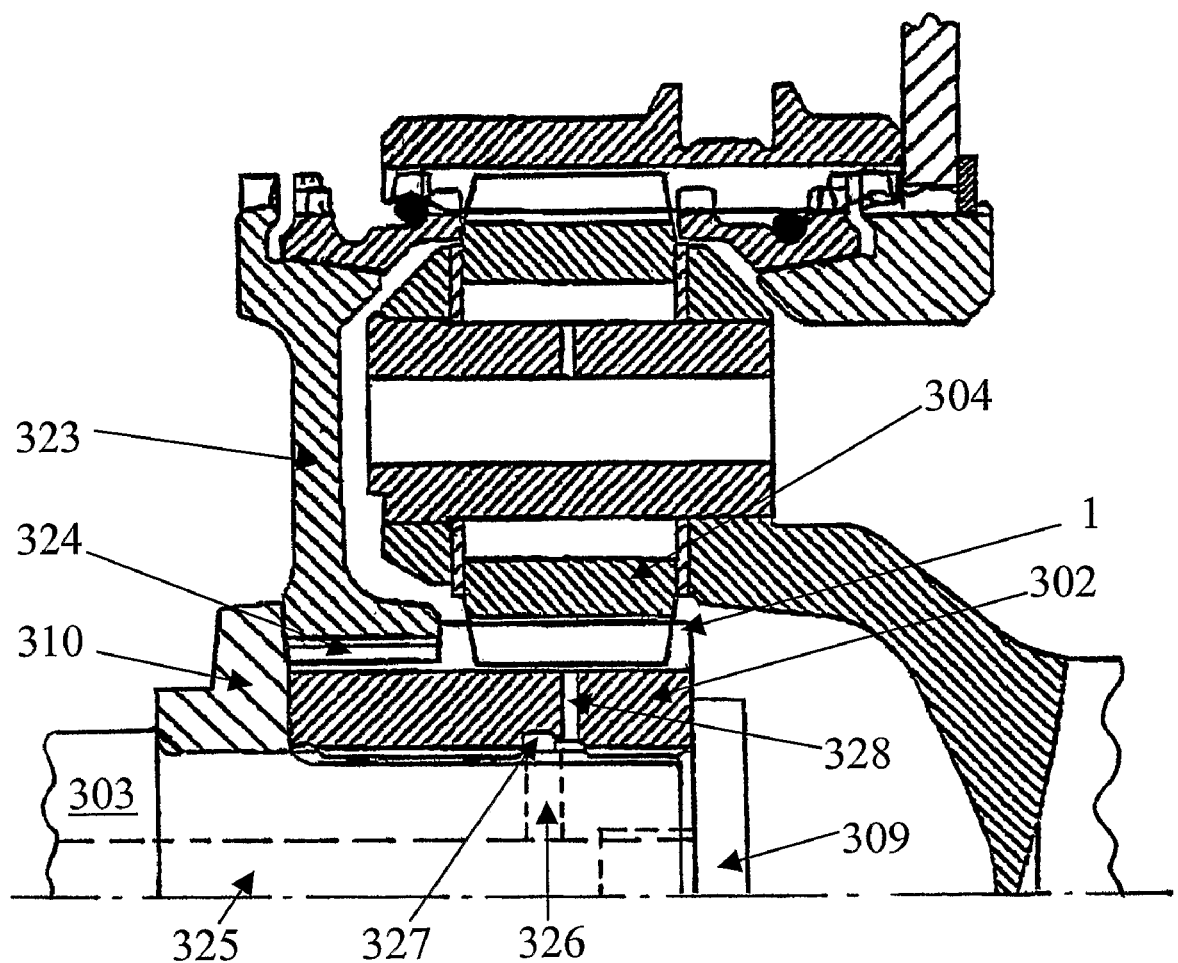
FIG. 1 shows a known lubricating device in a range gearbox according to SE 514231.

FIG. 1 shows a section of a known range gearbox of planetary type like that disclosed in SE 514231. The functioning of the planetary gear or the range gearbox is not dealt with in greater detail in this application. As can be seen from FIG. 1, a spline joint is located directly adjacent to the teeth 1 of the sun wheel. There, the teeth 1 on the sun wheel 302 are extended at one end. A coupling ring 323 has internal teeth which fit in the gaps between the extended teeth 1 on the sun wheel 302. In the assembled state, the tooth surface of the extended teeth 1 forms, together with the internal teeth of the coupling ring, a spline joint 324. The spline joint 324 means that the coupling ring 323 is connected to the sun wheel 302 in a rotationally fixed manner. The extended teeth 1 on the sun wheel 302 have a maximum diameter which is smaller than the maximum diameter on the part of the teeth 1 which is in engagement with the teeth on the planet wheels 304. By means of a screw 309, spacer ring 310 and bearing (not shown), the coupling ring 323 and the sun wheel 302 are fixed on the main shaft 303 in the axial direction. The lubricating oil for lubricating the teeth above all the sun wheel, but also of the planet wheels, is conducted from a central hole 325 in the main shaft 303 via a radially drilled hole 326 to an annular groove 327 on the inside of the sun wheel 302. From the groove 327, the lubricating oil is distributed through small radial holes 328 which are drilled in the bottom of each gap between the teeth 1 on the sun wheel 302.

The central hole 325 is provided directly or indirectly with connection means (not shown) for lubricant under pressure. Lubricant is squirted out through all the mouths of the radial holes 328 simultaneously and in a parallel fashion, which means that all the teeth 1 on the sun wheel will be lubricated continuously.

Figure 2:
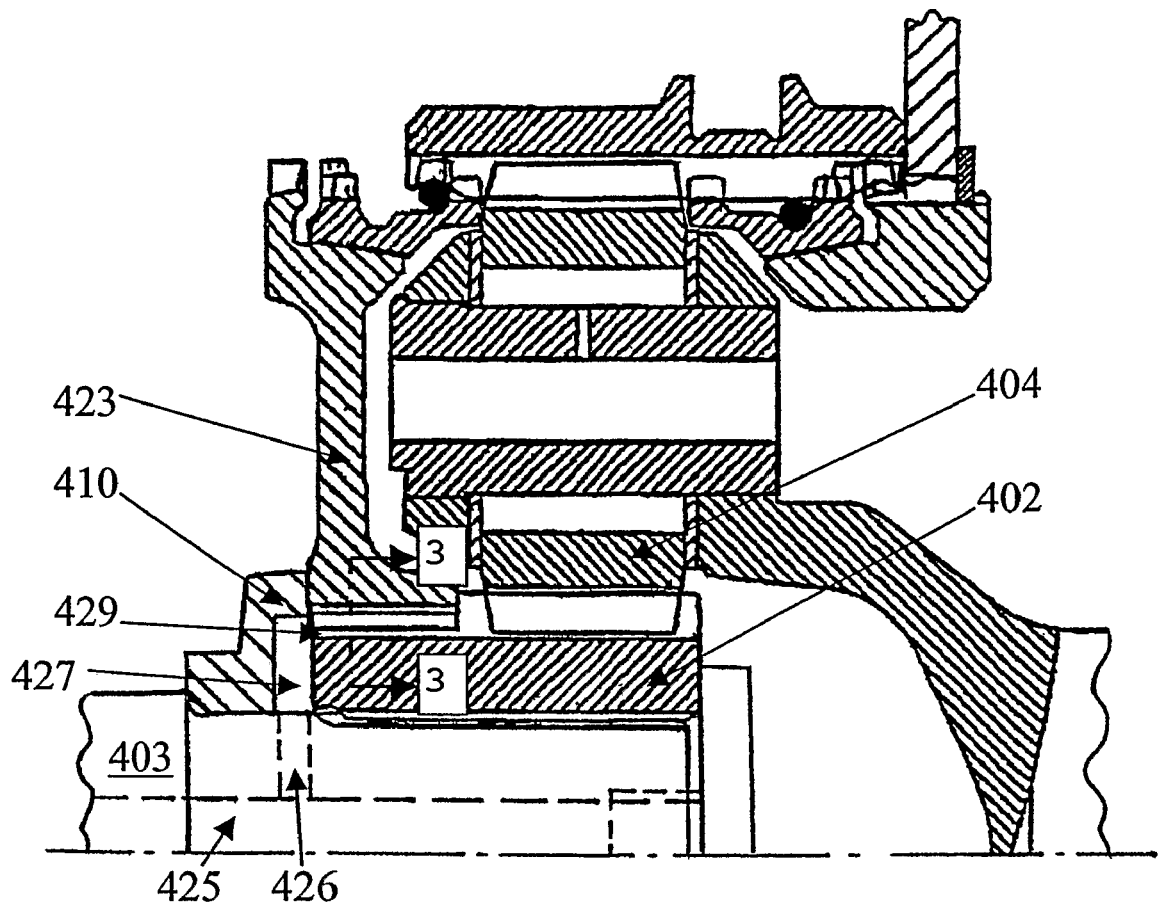
FIGS. 2, 4, 5 and 6 each show an embodiment of the lubricating device according to the invention in cross-section.
Figure 3:
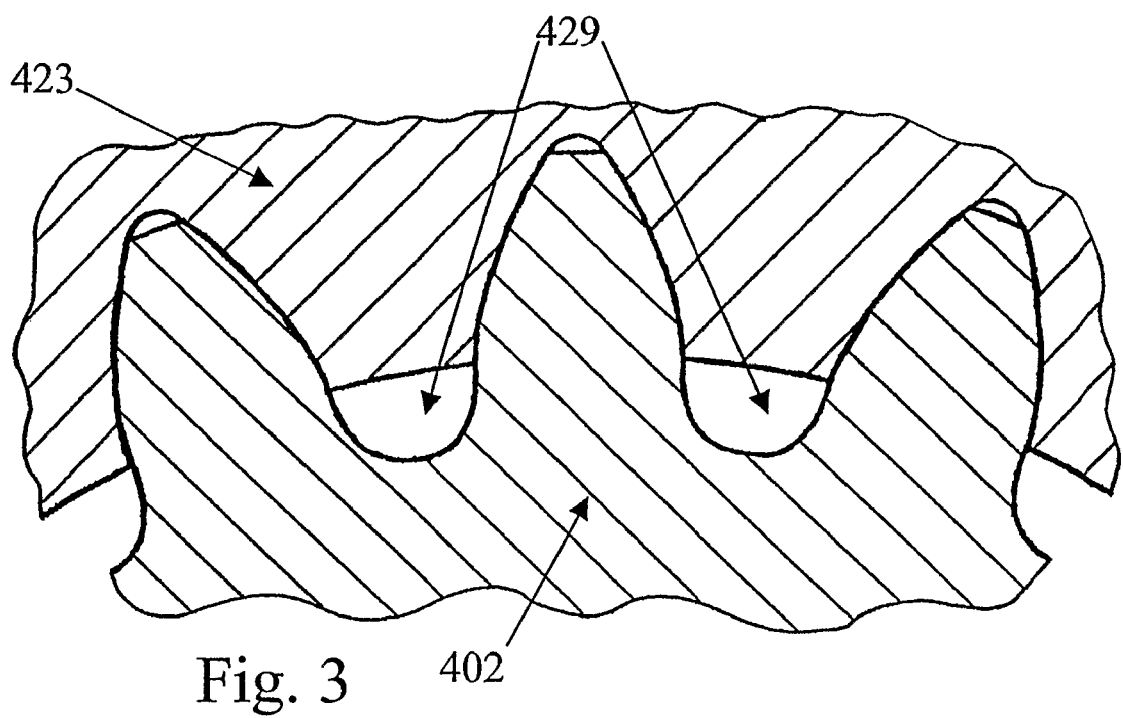
FIG. 3 shows a cross section according to 3—3 in FIG. 2.

FIG. 2 shows a first preferred embodiment of the invention. Here, the lubricating oil is conducted from the central hole 425 in the main shaft 403 via a radial hole 426 to an annular space 427 between the main shaft 403 and a spacer ring 410. From the space 427, the lubricating oil is distributed to the lubricant ducts 429 which are formed between the tips of the internal teeth on the coupling ring 423 and the bottom of the gaps, the roots, between the extended teeth on the sun wheel 402. The lubricant ducts 429 conduct the lubricating oil to the tooth engagement between the sun wheel 402 and the planet wheels 404. The diameter of the tips of the internal teeth on the coupling ring 423 can be designed as constant or varying in the axial direction so that a suitable oil flow is obtained. FIG. 3 is a cross section of the connection between the sun wheel 402 and the coupling ring 423 taken along 3—3 in FIG. 2.

Very effective lubrication and simultaneous cooling of all the teeth 1 on the sun wheel 302 is obtained in this way. Moreover, the lubricant ducts 429, because of their mouths, mean that all of the lubricant arrives in the correct place; that is to say, is used for lubricating and cooling the gear teeth of the gear in turn which means that there is less waste of lubricant compared with, for example, devices where the oil is squirted out through nozzles toward the gearwheel at a certain distance therefrom.

An alternative embodiment is to machine the tooth tips of the sun wheel so that lubricant ducts are also formed in the space between the tooth tips of the sun wheel 402 and the tooth roots of the coupling ring. The number of lubricant ducts would thus be doubled.

Figure 4:
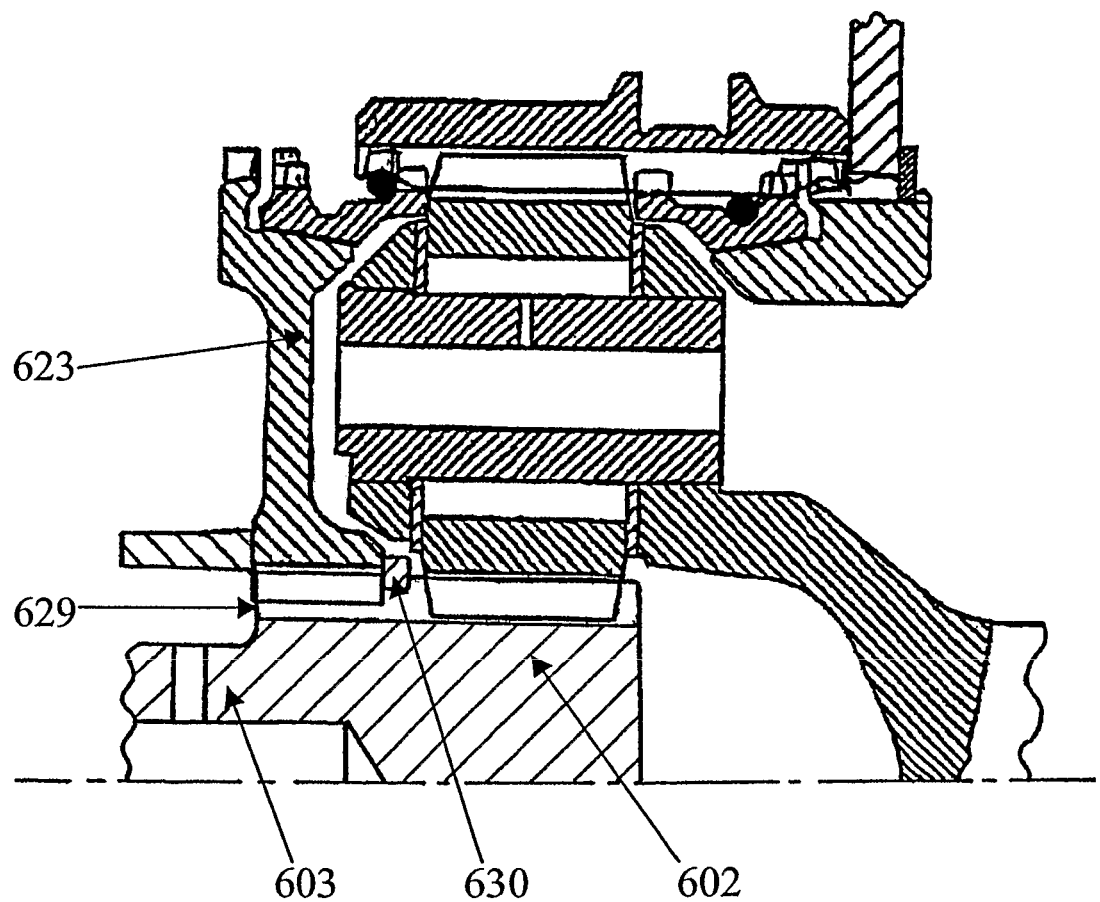

Another alternative embodiment is to have lubricant ducts only in the space between the tooth tips of the sun wheel and the tooth roots of the coupling ring. FIG. 4 shows an alternative embodiment of the invention. The sun wheel 602 is integrated in the main shaft 603. A circlip 630 fixes the coupling ring 623 in the axial direction in relation to the main shaft 603.

The lubricating oil is conducted to the tooth engagement via lubricant ducts 629 which are formed between the tips of the internal teeth on the coupling ring 623 and the roots of the extended teeth on the sun wheel 602.

Figure 5:
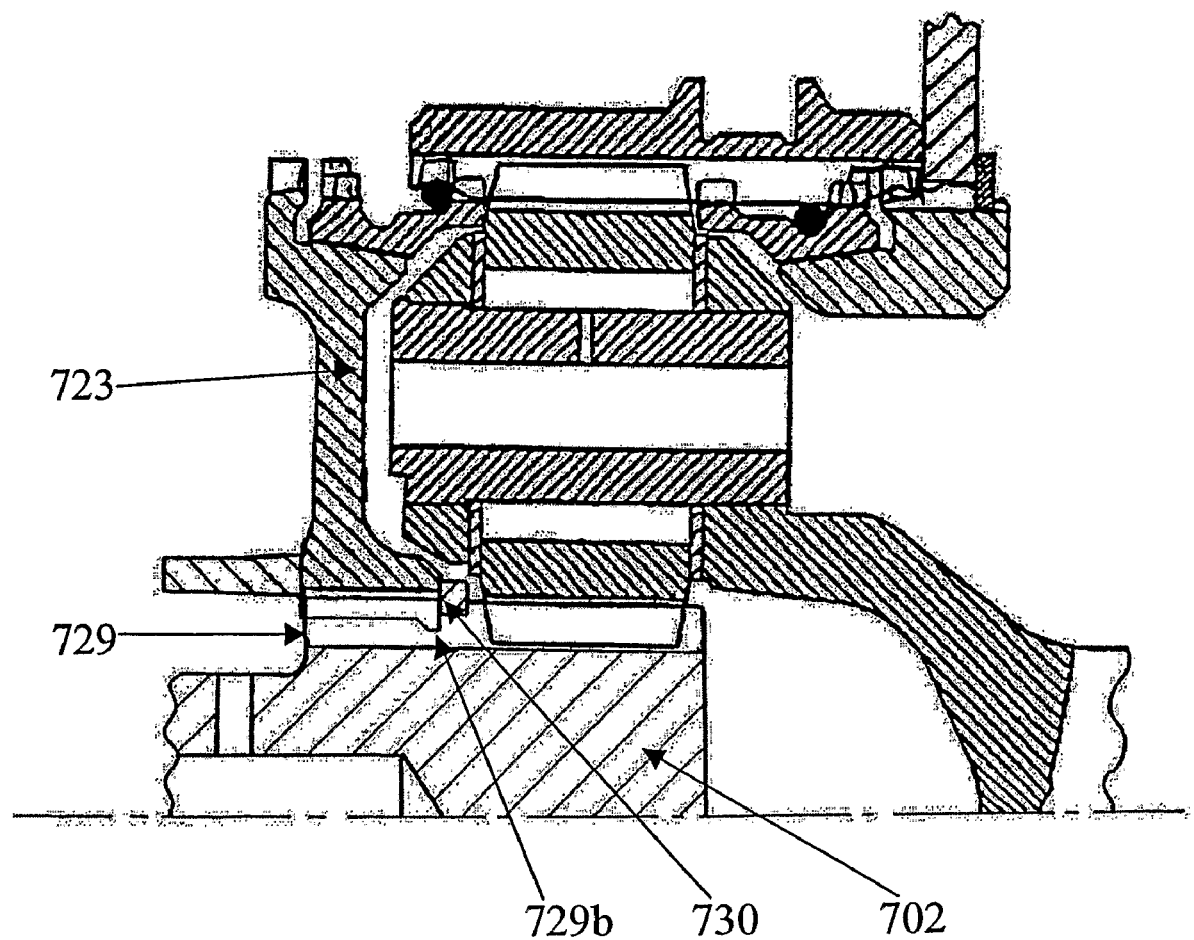

FIG. 5 shows a variant of the embodiment in FIG. 4.

In order to reduce and concentrate the flow resistance in the lubricant ducts 729, the inside diameter of the coupling ring 723 is increased apart from in the portion next to the circlip 730. Narrowings 729b are formed there, in which the lubricant flow is concentrated into small jets in the roots of the teeth on the sun wheel 702.

Figure 6:
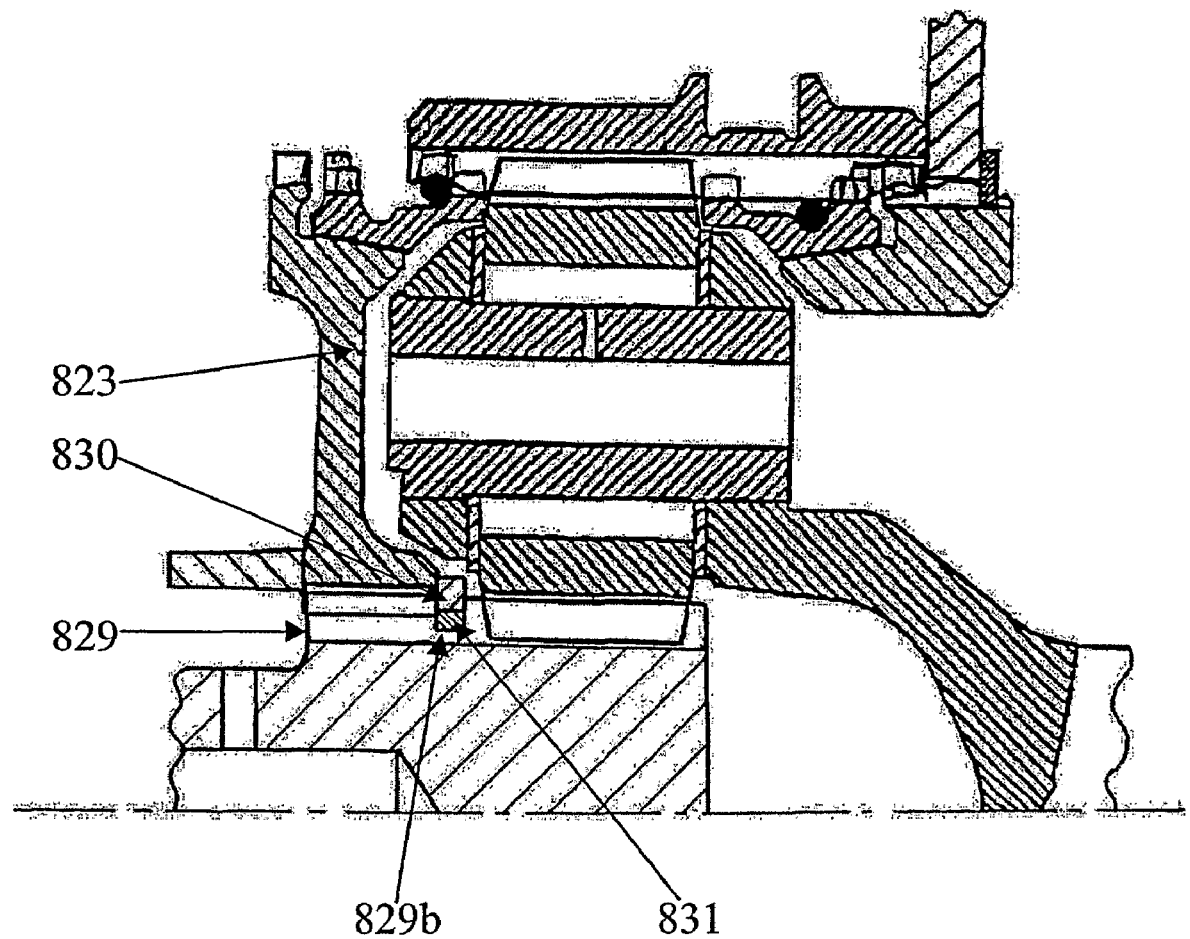

A similar effect can be obtained in the embodiment shown in FIG. 6. Here, the inside diameter of the coupling ring 823 is increased over its entire axial extent. The narrowings 829b of the lubricant ducts 829 are brought about by a ring 831 which is located radially inside the circlip 830. The ring 831 can be closed and made of a highly elastic material, for example rubber. The ring can also be open or in two parts. Another alternative is for the ring to be made as a part of the circlip 830. Consequently, only one ring then has to be mounted.

It is also possible to use the device according to the invention in types of gear other than planetary gears. The gearwheel to which the invention is applied does not have to be arranged at one end of a shaft but can also be arranged somewhere along a shaft. The number of lubricant ducts can be selected freely so that, for example, a mouth is arranged only between every second or every third tooth pair.

The invention is of course not limited to the illustrative embodiments described above, but changes can be made within the scope of the patent claims.

What is claimed is:

1. An arrangement for lubricating a gear, said arrangement comprising:
   a first gearwheel (402, 602, 702) in engagement with a second gearwheel (404);
   teeth of the first gearwheel having an axial extent longer than the entire axial extent of teeth of the second gearwheel;
   a first tooth surface of the first gearwheel being in engagement with the teeth of the second gearwheel;
   a second tooth surface of the first gearwheel (402, 602, 702) constituting a part in a spline joint together with corresponding internal teeth of a gear element (423, 623, 723, 823); and
   a lubricant duct (429, 629, 729, 829) arranged to conduct lubricant to the first tooth surface and said lubricant duct (429, 629, 729, 829) formed as a space between a tooth tip and a corresponding tooth root in the spline joint.

2. The arrangement as recited in claim 1, wherein the lubricant duct (429, 629, 729, 829) consists of a space between the tooth tip of the gear element (423, 623, 723, 823) and the corresponding tooth root of the first gearwheel.

3. The arrangement as recited in claim 2, further comprising:

an inside diameter of the tooth tips of the gear element, at the lubricant duct mouth next to the second gearwheel (404), being smaller along a part of the axial extent of the tooth tips compared with the inside diameter of the remaining axial extent of the tooth tips.

4. The arrangement as recited in claim 3, wherein the tooth tips of the gear element with the smaller inside diameter constitute a relatively small part of a total axial extent of the teeth of the gear element.

5. The arrangement as recited in claim 2, wherein an all-round groove on a third tooth surface between the first and second tooth surfaces holds a ring (831) in such a way that the ring (831), together with the tooth root of the first gearwheel, constitutes an extension of the lubricant duct (429, 629, 729, 829) and so that the ring (831) obstructs the mouth of the lubricant duct for the purpose of obtaining a smaller mouth.

6. The arrangement as recited in claim 1, wherein spaces between the tooth roots of the first gearwheel and tooth tips of the gear element constitute a plurality of lubricant ducts (429, 629, 729, 829).

7. The arrangement as recited in claim 1, wherein the gear element (423, 623, 723, 823) consists of a coupling ring and the first gearwheel (402, 602, 702) consists of a sun wheel, and both the coupling ring and the sun wheel forming part of a range gearbox with planetary gear stages.

\* \* \* \* \*